Sept. 16, 1941. H. A. ANDRESEN 2,256,007
TEMPERATURE INDICATOR
Filed July 24, 1939
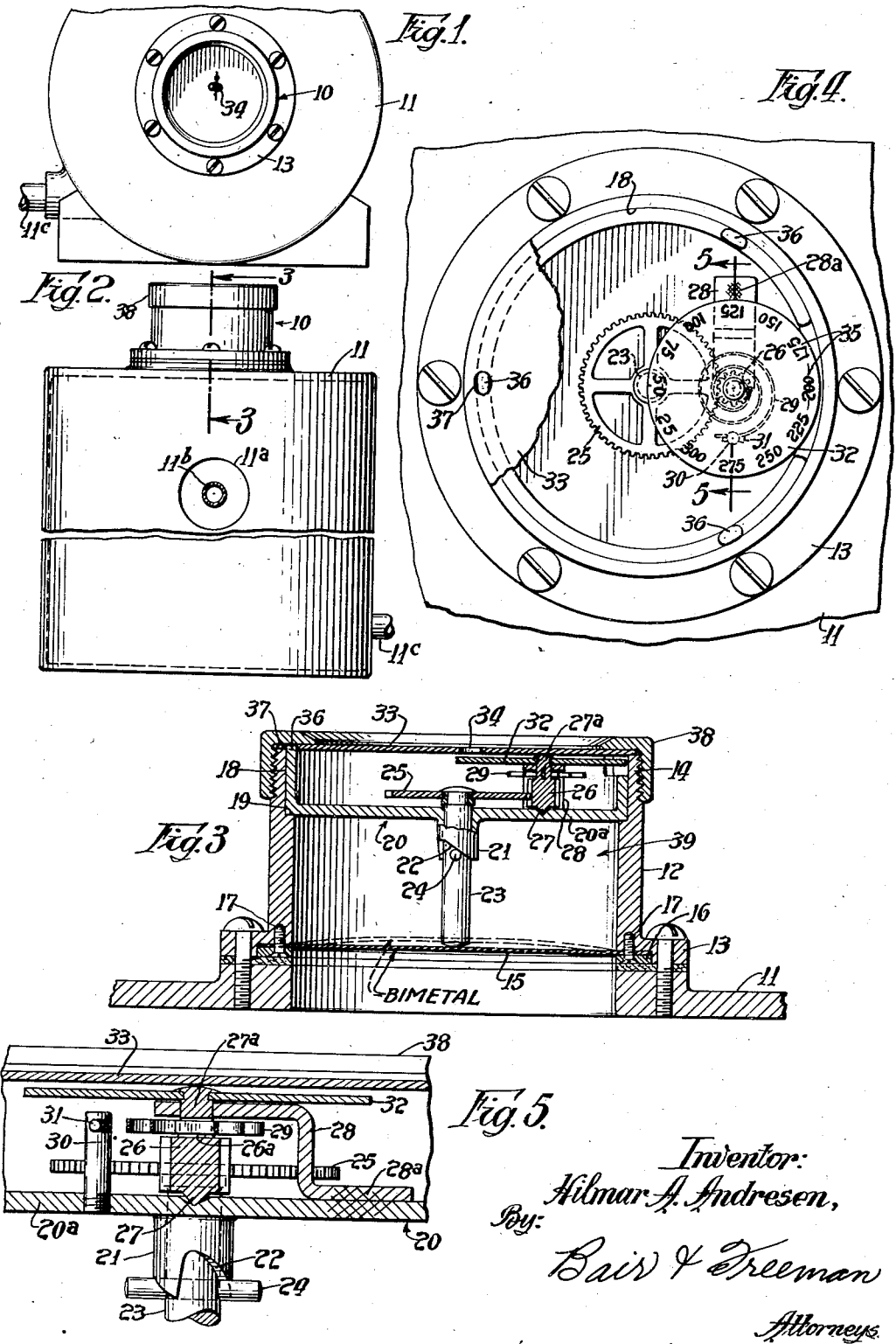

Patented Sept. 16, 1941

2,256,007

UNITED STATES PATENT OFFICE 2,256,007

TEMPERATURE INDICATOR

Hilmar A. Andresen, Chicago, Ill., assignor to E. Edelmann & Co., Chicago, Ill., a corporation of Illinois Application July 24, 1939, Serial No. 286,263

6 Claims. (Cl. 73—363)

This invention relates to improvements in temperature indicators of the type that indicate the degrees of heat inside a chamber but are readable from the outside thereof.

One of the objects of the present invention is to provide in a temperature indicator of the type mentioned, means to convert the slight movement of a heat sensitive diaphragm responding to the temperature of a medium, such as liquid within a chamber, into a greatly magnified rotating movement of an indicator outside the chamber.

Another object is to provide in a temperature indicator of the foregoing mentioned type, means whereby the casing of the indicator may be attached to a chamber such as a tank or the like so that only the inside face of a heat sensitive diaphragm carried by the casing will be in contact with the contents of the chamber.

Yet another object of this invention is to provide, in a temperature indicator of the type described, means to readily attach the indicator to a tank or the like without danger of breakage or displacement of the operating parts of the indicator as a result of accidental contact of the person of the installer or of tools with said parts.

A further object is to provide an air space to serve as insulation between the diaphragm responsive to the temperature of the medium contained in a tank or chamber and the indicator on the outside thereof.

A further object is to provide a temperature indicator which is simple in construction and therefore inexpensive to manufacture and assemble.

Still a further object is to provide a temperature indicator including an actuating diaphragm adapted to span an opening in a tank and thereby accurately responsive to the temperature of a medium in the tank, sealing means being provided between the diaphragm and the tank to prevent leakage of the medium from the tank.

A further and more specific object is to provide sliding means responsive to the bowing of the diaphragm and cooperating with an indicator through motion converting and step up gearing mechanism.

The above mentioned objects together with other objects and advantages of this invention will become apparent as I proceed with the specification.

In the accompanying drawing I have shown a preferred embodiment of my invention. This drawing is not intended to be exhaustive and is not to be taken as limiting of the invention, but on the contrary is chosen with a view to illustrating my invention so that others skilled in the art may apply it under varying conditions of practical use and may make such modifications and changes therein as such conditions may make desirable.

In the drawing:

Figure 1 is an end elevation of a tank on which my temperature indicator has been mounted;

Figure 2 is a plan view thereof;

Figure 3 is a sectional view on an enlarged scale taken on the line 3—3 of Figure 2;

Figure 4 is an enlarged view of the indicator shown in Figure 1 with a rim removed and the major portion of a cover broken away, and Figure 5 is a vertical section on the line 5—5 of Figure 4 on a further enlarged scale.

Referring now in detail to the embodiment of the invention illustrated in the drawing, 10 indicates generally my temperature indicator attached to a chamber, tank or the like 11. The tank 11 is open to atmosphere as at 11a and may be used for the storage of liquid or the like. I show an inlet pipe 11b for supplying liquid thereto and an outlet pipe 11c from the tank.

For convenience in illustration, the temperature indicator has been shown as attached to the end of a chamber but obviously it would be just as efficient if attached to the bottom thereof. Preferably, however, it is positioned just below the liquid level in the tank to obviate the necessity of correction in the temperature reading given by the indicator for the head of liquid in the tank.

A cylindrical casing 12, provided at one end with a flange 13 and threaded at its other end as at 14 serves as a housing for my temperature indicator. A heat sensitive diaphragm 15 is secured to the flanged portion of the casing by means of a ring 16 and countersunk flat head screws 17. The diaphragm 15 is formed of bimetal or other suitable heat responsive material. The diaphragm 15, when it is subjected to heat, will become bowed as indicated by dotted lines in Figure 3.

The threaded portion 14 of the casing 12 is internally recessed as indicated at 18 to provide a seat 19 for a cup-like member 20. Centrally located on a bottom wall 20a of the member 20 is an apertured cylindrical extension 21 provided with spiral cam surfaces 22. An actuating member or stub shaft 23 has slidable bearing in the extension 21 and carries a cross pin 24 riding on the cam surfaces 22. The inner end of the stub shaft 23 is in contact with the central portion of the diaphragm 15 and is slidably actuated in one direction by the bowing movement thereof.

The outer end of the shaft 23 extends through the wall 20a and has fixed thereon a spur gear 25 in mesh with a pinion 26. The pinion 26 has a needle point bearing 27 with the bottom wall 20a. An extension 27a of the pinion 26 is rotatively journaled near its other end in a Z bracket 28. One arm of the bracket 28 is secured to the bottom wall 20a of the member 20 as by spot welding indicated at 28a. The inner end of a spiral hair spring 29 is secured in a slot 26a in the cylindrical extension 27a of the pinion 26. The outer end of the spring 29 is secured as by a wedge 31 to a pin 30 threaded or otherwise fixed on the wall 20a.

A dial 32 is secured to the extension 27a of the pinion 26 at a point outside the bearing bracket 28. A disk-like cover 33 has an aperture 34 located therein to register with indicia 35 of the dial 32. The cover 33 is fixed against rotation relative to the cuplike member 20 as by means of lugs 36 and openings 37. A rim 38 is threaded on the housing 12 to retain the parts in proper operative relation to each other. A comparatively large dead air space 39 is provided between the diaphragm and the member 20 so that a minimum amount of heat will be permitted to pass from the chamber 11 to the moving parts of my temperature indicator.

Practical operation

The operation of my temperature indicator is as follows: As the temperature of the medium in the chamber or receptacle 11 increases, it will cause the diaphragm 15 to expand or bow in one direction an amount proportionate to the degree of heat within the chamber, thereby pushing the stub shaft 23 outwardly the same distance. The pin 24 fixed in the shaft 23 is in contact with the cam surfaces 22, thereby imparting to the shaft and spur gear 25 a clockwise movement as viewed in Figure 4. The pinion 26 and the dial 32 will be rotated an increased number of degrees in a counterclockwise direction depending upon the tooth relation between the gear and pinion. Rotation of the pinion energizes or winds up the spiral hair spring 29. As a result of these operations, one of the indicia 35 indicating the degrees of heat inside the chamber will be brought to view through the opening 34.

As the temperature inside the chamber 11 decreases, the diaphragm 15 is contracted thereby and the spring 29 will rotate the shaft 23 in a counterclockwise direction through the pinion 26 and spur gear 25.

The pin 24 will be held thereby in contact with the cam surfaces 22 and the inner end of the shaft 23 will be held in contact with the retreating diaphragm 15. These operations result in rotating the dial 32 in a reverse or clockwise direction, exposing to view one of the lower indicia 35 through the opening 34. The tension of the hair spring 29 is taken into consideration when calibrating the disc 32. The disc is preferably frictionally held on the extension 27a so that it can be adjusted to the proper position after assembly. With the room temperature known, it is merely necessary to rotate the disc 32 to a position indicating that temperature while holding the pinion 26 stationary. Thereafter the temperature indication will be in proper proportion to expansion of the diaphragm 15 and there will always be an immediate response to changes in the temperature of the medium in the tank 11 without any substantial lag.

Although I have illustrated step-up gearing for the indicating disc, it is obvious that this disc could be located directly on the shaft 23. The indicating indicia would then have to be more closely spaced and there would accordingly be more chance for variation from the temperature in reading the indicator.

While in describing the invention I have referred in detail to the construction, form and arrangement of the various parts thereof, it is to be understood that I am not limited thereto, as many changes and substitutions of mechanical equivalents can be made within the scope of the appended claims.

What I claim as new and desire to secure by Letters Patent is:

1. In a device of the class described, a casing, a heat sensitive diaphragm secured to said casing, a hub in said casing, a member slidable in said hub and actuated in one direction by said diaphragm when subjected to rising temperature of a medium in contact therewith, one end of said hub having opposite helical faces and a cross pin carried by said slidable member and coacting therewith to impart turning movement to said slidable member in proportion to the sliding movement thereof, an indicator operated in one direction by said slidable member, and means for biasing said indicator in the opposite direction, said last means effecting return of said slidable member by retention of said cross pin in contact with said opposite helical faces as said diaphragm recedes because of the temperature of said medium decreasing.

2. In a device of the class described, a casing, a heat sensitive diaphragm secured to one end of said casing, an actuating member including a shaft actuated axially in one direction by said diaphragm when subjected to rising temperature, a hub rotatably and slidably receiving said shaft, a lateral projection on said shaft, said hub having a helical end adapted to be engaged by said projection to impart turning movement to said actuating member proportionate to the movement of the diaphragm, an indicator dial driven in one direction by said actuating member, an index for registration with the graduations of said dial, and spring means energized by the movement in said one direction of the indicator dial, said spring means effecting retention of said projection in engagement with said helical end of said hub and return of said actuating member as said diaphragm recedes as a result of lowering temperature.

3. In a temperature indicator of the class described, a casing having a hub provided with a helical face on one end thereof, a heat sensitive diaphragm secured to one end of said casing for contact with a liquid or the like, a stub shaft within the casing and slidably actuated in one direction by said diaphragm, said shaft having a projection coacting with said helical face to constitute cam means for imparting rotation to said stub shaft as said diaphragm slides the stub shaft in said direction, an indicator dial geared by step-up gearing to said stub shaft and thereby rotated a proportionately greater number of degrees by said stub shaft, said indicator dial being readable from outside said casing, and spring means energized by rotation of said stub shaft in said one direction to retain said diaphragm, said stub shaft, said projection, said helical face, and said dial in operative relation to each other.

4. In a temperature indicator of the class described, a casing having a hub, a heat sensitive diaphragm secured thereto and responsive to the temperature of a medium in contact with one side thereof, a stub shaft within the casing and slidably actuated in one direction axially of said hub by said diaphragm, said hub having a helical face and said stub shaft having a lateral projection cooperating therewith for imparting rotation to said stub shaft as a result of sliding movement thereof through said hub caused by said diaphragm, an indicator geared to, and rotated a proportionately greater number of degrees than said stub shaft, said indicator being readable from outside said casing, and spring means energized by rotation of said stub shaft in one direction to rotate the stub shaft in the opposite direction when the diaphragm recedes in its movement.

5. In a temperature indicator, a casing, means for mounting said casing on a tank or the like over an opening therein, a diaphragm carried by said casing, means for sealing the periphery of said diaphragm relative to said tank surrounding said opening whereby the diaphragm spans the opening and is directly responsive to the temperature of the medium in said tank, said diaphragm being formed of bimetallic material, a slidably and rotatably mounted shaft carried by said casing and engaging said diaphragm at substantially the center thereof, a cam surface stationary relative to said casing, a projection from said shaft coacting therewith for imparting rotation to said shaft as it is moved in one direction by said diaphragm, means biasing said shaft to revolve in an opposite direction to return it and keep said projection in contact with said cam surface and said shaft in contact with said diaphragm, an indicator operatively connected with said shaft by means of step-up gearing, and a cover for said casing to enclose said indicator, biasing means and shaft, said cover having a window to observe the movement of the indicator.

6. A temperature indicator comprising a cylindrical casing, a temperature responsive disclike diaphragm on one end of said casing, a cylindrical cuplike member in the other end of said casing, a stub shaft slidably and rotatively mounted in said cuplike member and actuated in one linear direction by said diaphragm abutting one end thereof, said cuplike member having a helical surface, said stub shaft having a projection coacting therewith to cause rotation of said stub shaft as it is moved in a linear direction, an indicator element in said cuplike element having indicia to indicate the position thereof, means for transmitting the rotational motion of said stub shaft to said indicator element, a cover for said indicator element and cuplike member, said cover having means to coact with an edge of said cuplike member to prevent rotation of one relative to the other and having a sight opening through which to view said indicator element, and spring means energized by rotation of said indicator element in one direction as imparted thereto by said stub shaft when actuated in said one linear direction by said diaphragm, said spring means rotating said indicator element in the opposite direction and actuating said stub shaft in a rotational direction to thereby retain said projection engaged with said helical surface and move the stub shaft in a linear direction opposite to said one linear direction when said diaphragm recedes in its movement.

HILMAR A. ANDRESEN.